Apr. 24, 1923.
W. WENDERHOLD
COMBINATION LAMP HOUSE SUPPORT
Filed April 13, 1917

INVENTOR
William Wenderhold

Patented Apr. 24, 1923.

1,452,582

UNITED STATES PATENT OFFICE.

WILLIAM WENDERHOLD, OF NEW YORK, N. Y., ASSIGNOR, BY MESNE ASSIGNMENTS, TO EDWIN J. BANZHAF, OF NEW YORK, N. Y.

COMBINATION LAMP-HOUSE SUPPORT.

Application filed April 13, 1917. Serial No. 161,923.

*To all whom it may concern:*

Be it known that I, WILLIAM WENDERHOLD, a citizen of the United States, residing at New York city, in the county and State of New York, have invented certain new and useful Improvements in Combination Lamp-House Supports, of which the following is a clear, full, and exact description.

This invention relates to a support for lamp houses such as are employed in combination with cinematograph projecting apparatus and stereopticon combined.

In projecting motion pictures and stereopticon pictures it is most practical to employ a single lamp house for both projections, and in doing so it is most difficult to procure two lenses which will give the same size picture on the screen, and it is also difficult to obtain good illumination in both pictures when the lamp house is the same distance from the screen for both pictures.

The usual contrivance now found in almost any motion picture projecting machine is to have the lamp house on a slidable base behind the projector, which lamp house is adapted to be moved out of alignment with the optical axis of the projector into the optical axis of the stereopticon lens, the sliding base being slidable at right angles to both optical axes, therefore causing the position of the lamp house to be always the same distance from the screen.

My invention is specifically designed to enable the operator of such apparatus to give the lamp house any desired position when moving said lamp house into alignment with the stereopticon optical axis, and at the same time retaining parallel alignment of the lamp house with both optical axes, thereby enabling the operator to have an independent distance from the lamp house to the screen for each optical axis.

Referring to the drawings.

Figure 1:
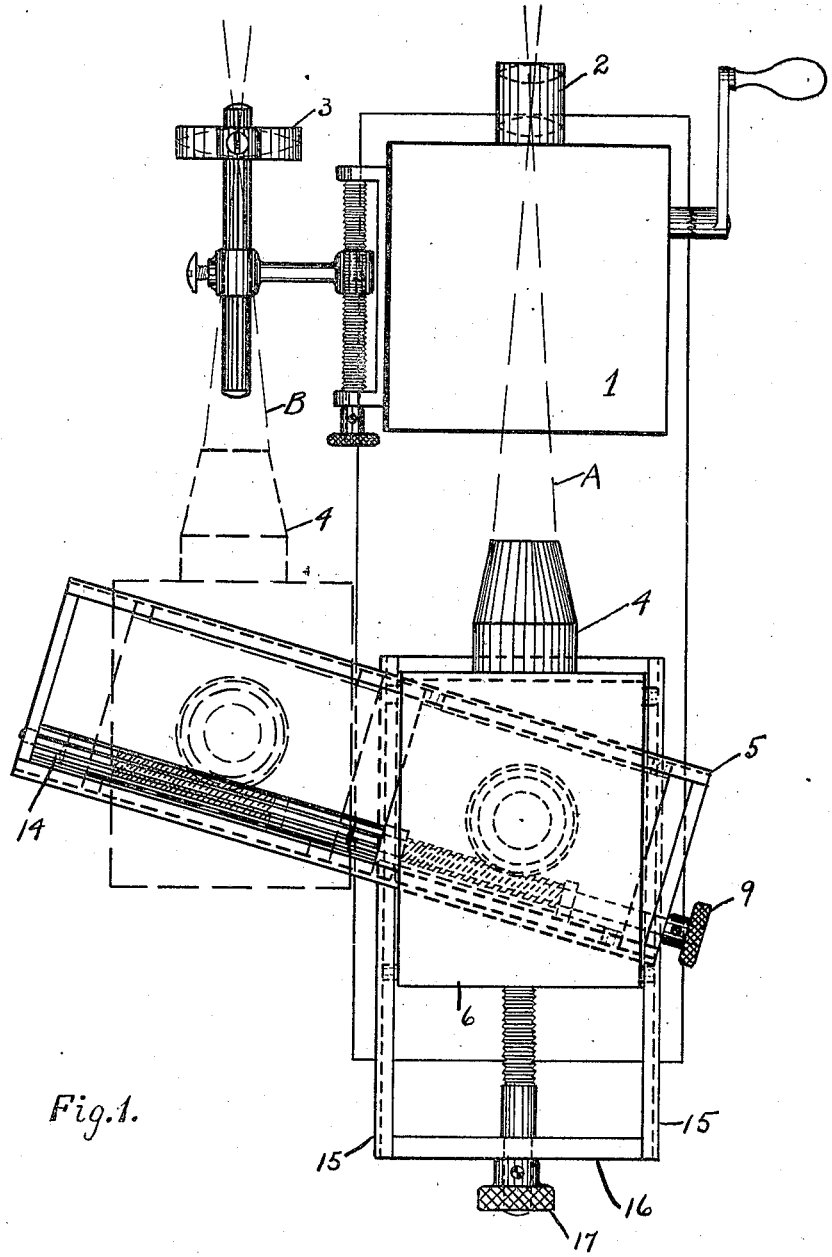
Fig. 1 is a top view of an apparatus embodying my invention.
Figure 2:
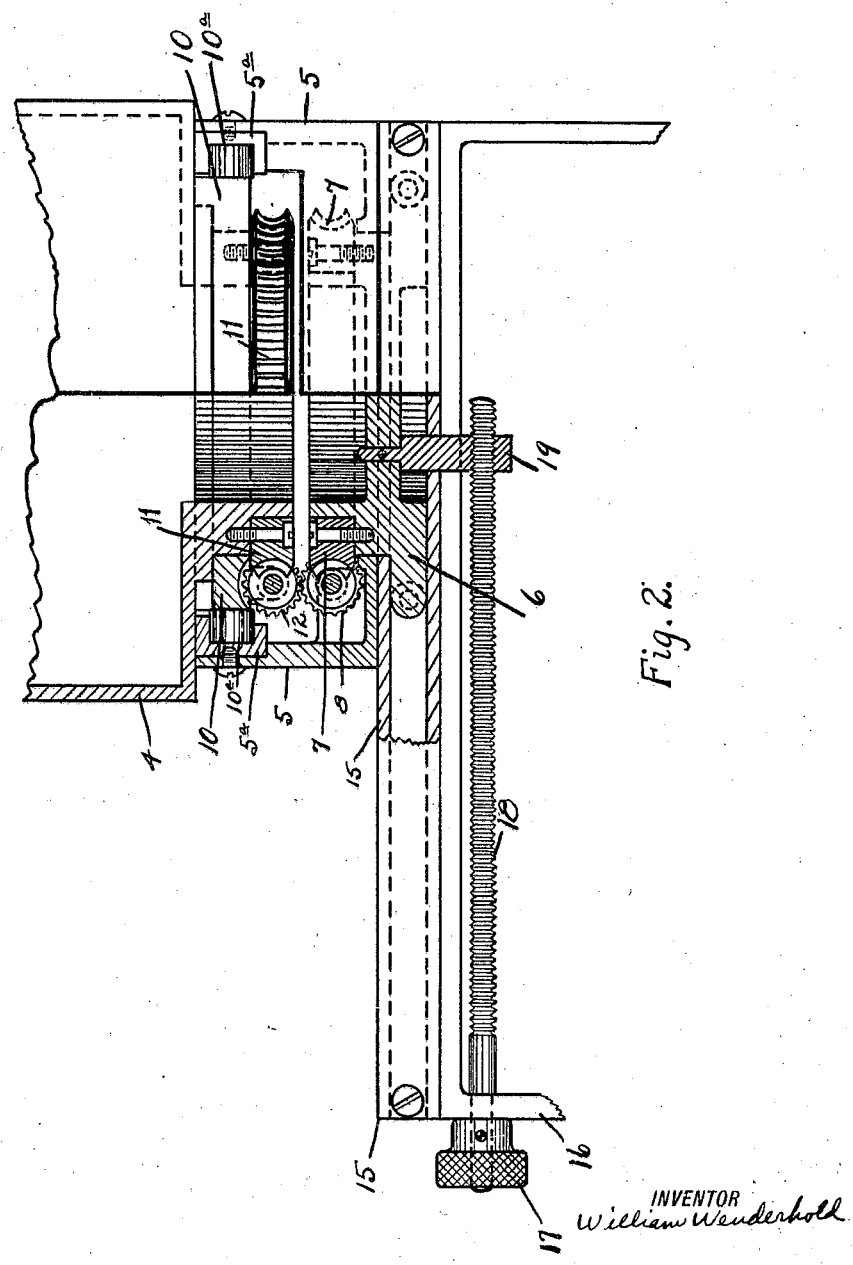
Fig. 2 is a partial side view, partly in cross-section.
Figure 3:
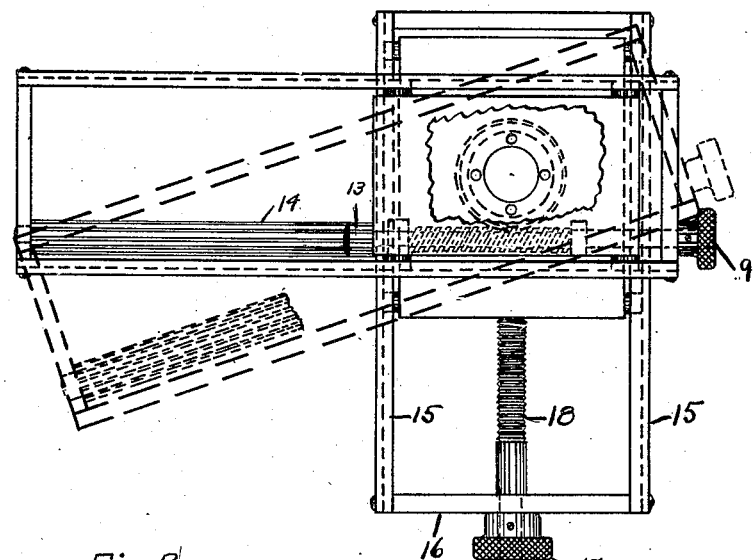
Fig. 3 is a top view of the sliding base.
Figure 4:
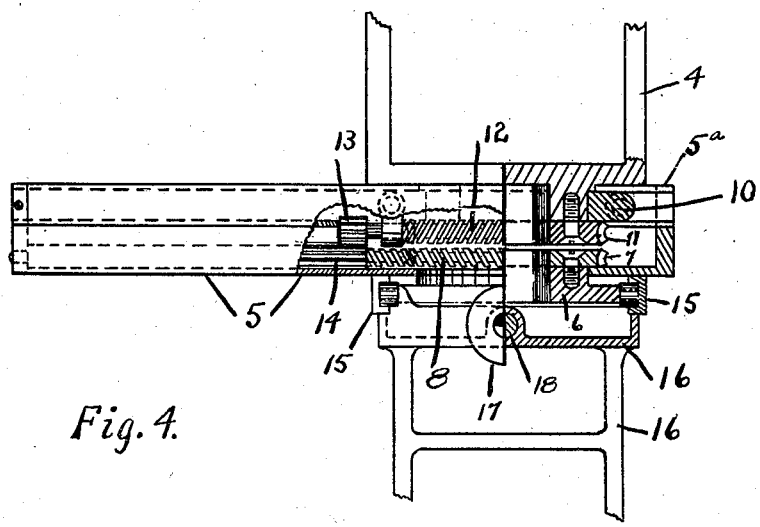
Fig. 4 is a back view, partly in cross-section.

As shown in the drawings, Fig. 1, A is the optical axis for the projector and lens 2. B is the stereopticon optical axis of lens 3. 4 is the lamp house shown in position behind projector 1 and in dotted lines behind lens 3. As shown in Fig. 1, the slide support 5 is not at right angles with optical axes A and B, but can be adjusted to that position and others as follows. The slide support 5 is pivoted in the base 6. On base 6 is fastened a worm gear 7 (see Fig. 2). A worm 8 is mounted in the slide support 5, which worm 8 on one extension carries a knob 9, by which the device is operated. When turning the knob 9, the whole slide support 5 is forced around the worm gear 7 on the base 6. The above are the means employed to move the slide support 5 pivotally on the axis of the worm gear 7.

Now, the next function of the device is to keep the lamp house 4 parallel with the optical axes A and B, no matter to what position the slide support 5 is moved. To accomplish this, the lamp house is pivotally mounted in the sliding frame 10, and a worm gear 11 is fastened to the housing 4. A worm 12 meshing with worm gear 11 is mounted in the sliding frame 10. This worm 12 has on one end of its axis a gear 13 meshing with a pinion bar 14, which is fastened to the axis of worm 8. The pinion bar extends through the slide support 5, engaging gear 13 during all positions which the housing 4 and sliding frame 10 may be brought to. It will now be clear that when knob 9 is revolved, worm 8 will cause to turn the slide support 5 pivotally about the fixed wheel or gear 7, pinion bar 14 will operate gear 13, and worm 12 will revolve worm gear 11 and thereby compensate the parallel alignment of lamp house 4 with optical axes A and B.

5ª are two tracks (U-shaped) fastened to slide support 5. 10ª are rollers engaging the tracks 5ª. The rollers 10ª are mounted on the sliding frame 10 to insure easy sliding of the lamp house 4 with slide frame 10. The base 6 is also mounted in two U-shaped tracks 15 to allow movement of the entire combination to and from the lenses 2 and 3, which is accomplished by revolving knob 17, which is mounted upon lead screw 18 in the permanent support 16. Lead screw 18 engages the threaded extension 19, which is fastened into the base 6. The U-shaped tracks 15 are also fastened to member 16.

It is readily understood that the worm gearing is not absolutely essential. The slide support 5 could be moved by hand and the lamp house also aligned by hand, but I employ the worm gearing for simplicity of operation and to insure against imperfect alignment with the optical axes A and B, as the lamp house is shifted to the different positions.

What I claim is:

1. In combination with a picture projecting apparatus having a plurality of optical axes, a supporting structure, a slidable base and a slidable support, a lamp house revolubly mounted in said slidable support, a worm gear mounted on the lamp housing engaging a worm mounted in the slidable support, a gear on a common axis with the worm, another gear meshing therewith and having a common axis with a second worm and mounted in the supporting structure of the slidable support, the last named supporting structure being revolubly mounted in a slidable base, a worm gear on said base engaging the aforementioned second worm, and a knob on the shaft of one of the worms to operate the entire device, as and for the purpose described.

2. The combination with a picture projecting apparatus including a plurality of projection lenses having their optical axes spaced apart from, but arranged in parallel relation to each other, of a lamp house, a pivotally mounted sliding support therefor upon which said lamp house is pivotally mounted, means for varying the distance between the lamp house and said lenses, and means for aligning the axes of said lamp house and the projection lenses.

Signed at the city of New York, New York, this eleventh day of April, one thousand nine hundred seventeen.

WILLIAM WENDERHOLD.